United States Patent
Chow et al.

(10) Patent No.: US 6,925,089 B2
(45) Date of Patent: Aug. 2, 2005

(54) MECHANISM TO CONSOLIDATE HPNA THREE NETWORK STATES INTO TWO NETWORK STATES

(75) Inventors: Peter Ka-Fai Chow, San Jose, CA (US); William Young, Palo Alto, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 879 days.

(21) Appl. No.: 09/847,754

(22) Filed: May 2, 2001

(65) Prior Publication Data

US 2002/0165974 A1 Nov. 7, 2002

(51) Int. Cl.[7] .............................. H04L 12/28; H04J 3/16
(52) U.S. Cl. ....................................... 370/419; 370/465
(58) Field of Search ............................... 370/419, 463, 370/465, 466, 467, 469, 252

(56) References Cited

U.S. PATENT DOCUMENTS 6,526,581 B1 * 2/2003 Edson .......................... 725/74
6,574,237 B1 * 6/2003 Bullman et al. ............. 370/465
6,600,755 B1 * 7/2003 Overs et al. ................. 370/465
6,701,406 B1 * 3/2004 Chang et al. ................ 710/310
6,724,871 B2 * 4/2004 Maytal ..................... 379/93.08
6,754,749 B1 * 6/2004 Mounsef et al. ............ 710/100
6,781,989 B1 * 8/2004 Acharya ...................... 370/469
6,801,541 B1 * 10/2004 Maleck ....................... 370/466
6,810,520 B2 * 10/2004 Lu et al. ..................... 719/310

* cited by examiner

Primary Examiner—Andy Lee
(74) Attorney, Agent, or Firm—Winstead Sechrest & Minick P.C.

(57) ABSTRACT

The present invention provides a network state machine which supports the three network states of the Home Phone Line Networking Alliance specification version 2.0 (HPNA 2.0) using two network states has been disclosed. When a station is in the V1M2 mode, instead of transmitting this frame in the 10M8 format frame with the gap frame, the frame is transmitted in the 1M8 format frame without any gaps in the frame. With this, the three network state equations of HPNA 2.0 collapses into two equations. With only two network states, the complexity of the network state machine is reduced, and a Physical Layer (PHY) which supports only the two network states may be used.

41 Claims, 2 Drawing Sheets

MECHANISM TO CONSOLIDATE HPNA THREE NETWORK STATES INTO TWO NETWORK STATES

FIELD OF THE INVENTION

The present invention relates to computer network, and more particularly to the handling of network states in a home phone line network.

BACKGROUND OF THE INVENTION

Home networks are becoming more common and desirable for connecting computers within a home. One type of home network is the home phone line network which uses telephone lines typically installed in residence homes for communication between computers in the home.

FIG. 1 illustrates a home phone line network. The Home Phone Line Networking Alliance (HPNA) has published a specification to standardize the behavior of home phone line networks. The current HPNA specification is version 2.0 ("HPNA 2.0"). The network comprises a control chip 100. The chip 100 further comprises a Media Independent Interface (MII) 106, a Media Access Control (MAC) 108, and a Physical Layer (PHY) 110. The chip 100 implements HPNA 2.0. The chip 100 receives a signal containing data packets through the telephone wires via a phone jack 102. There is an analog front end (AFE) 104 which processes the signal between the chip 100 and the telephone wires. The chip 100 then processes the packets received in the signal from the AFE 104, and outputs a signal to the Host MAC 112.

Under HPNA 2.0, stations in the network supports a 10 megabits-per-second (mbps) data rate and/or a 1 mbps data rate, depending on the network state of the station. Such are referred to as "10M8 stations". Stations implemented under a previous version of the HPNA specification ("HPNA 1.x") supported only the 1 mbps data rate. Such stations are referred to as "1M8 stations".

There are three possible network states for 10M8 stations: V1M2 mode, 1M8 mode, and 10M8 mode. 10M8 stations in the 1M8 mode transmit only 1M8 format frames, with a private communication (PCOM) field set to 1 or 2. The PCOM is a field in the frame. Its information is used by the PHY 110 in node-to-node communications. The PCOM field is set as follows:

PCOM=0 refers to a 1M8 station;
PCOM=1 refers to a 10M8 station functioning in V1M2 mode or 1M8 mode if V1_DETECTED is not asserted; and
PCOM=2 indicates a 10M8 station functioning in V1M2 mode or 1M8 mode if V1_DETECTED is asserted.

The signal, V1_DETECTED, is described further below. 10M8 stations in the 10M8 mode transmit only 10M8 format frames. 10M8 stations in the V1M2 mode transmit either 1M8 format frames to 1M8 stations with a PCOM set to 1 or 2, or 10M8 compatible format frames to 10M8 stations. The 10M8 compatible frame contains a gap within the data frames. This "gap frame" provides interoperability between the format frames under HPNA 2.0 and HPNA 1.x.

The following equations set forth the three modes possible for a 10M8 station:

V1M2_MODE:=(not ConfigV1) and ((not ConfigV2) or ConfigV1M2) and (ConfigV1M2 or V1_DETECTED or V1_SIGNALED)

1M8_MODE:=ConfigV1

10M8_MODE:=not (V1M2_MODE or 1M8_MODE)

ConfigV1M2 is a signal which forces a station into the V1M2 mode. ConfigV1 is a signal which forces a station into the 1M8 mode. ConfigV2 is a signal which forces a station into the V1M2 mode.

V1_DETECTED is a signal which is asserted when a 10M8 station, while in 10M8 Mode and with Link Integrity Status=DOWN, detects a 1M8 format frame with a PCOM= 1. V1_DETECED is also asserted when a 10M8 station detects a 1M8 format frame with a PCOM=0. The Link Integrity Status indicates whether or not the station is connected with another station. If the station is disconnected, then the Link Integrity Status=DOWN. If the station is connected, then the Link Integrity Status=UP.

V1_SIGNALED is a signal which is asserted when a 10M8 station detects or transmits a 1M8 format frame with a PCOM=2.

However, a problem occurs when the PHY 110 supports only the 1M8 and 10M8 modes, but not the V1M2 mode. This occurs when the PHY 110 does not support sending a 10M8 compatible frame and replacement of the PHY 110 is not viable.

Accordingly, there exists a need for a network state machine which supports the three network states of HPNA 2.0 using only two network states. The present invention addresses such a need.

SUMMARY OF THE INVENTION

The present invention provides a network state machine which supports the three network states of the Home Phone Line Networking Alliance specification version 2.0 (HPNA 2.0) using two network states has been disclosed. When a station is in the V1M2 mode, instead of transmitting this frame in the 10M8 format frame with the gap frame, the frame is transmitted in the 1M8 format frame without any gaps in the frame. With this, the three network state equations of HPNA 2.0 collapses into two equations. With only two network states, the complexity of the network state machine is reduced, and a Physical Layer (PHY) which supports only the two network states may be used.

DETAILED DESCRIPTION

The present invention provides a network state machine which supports the three network states of the Home Phone Line Networking Alliance (HPNA) specification version 2.0 using two network states. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIG. 2 in conjunction with the discussion below.

Figure 1:
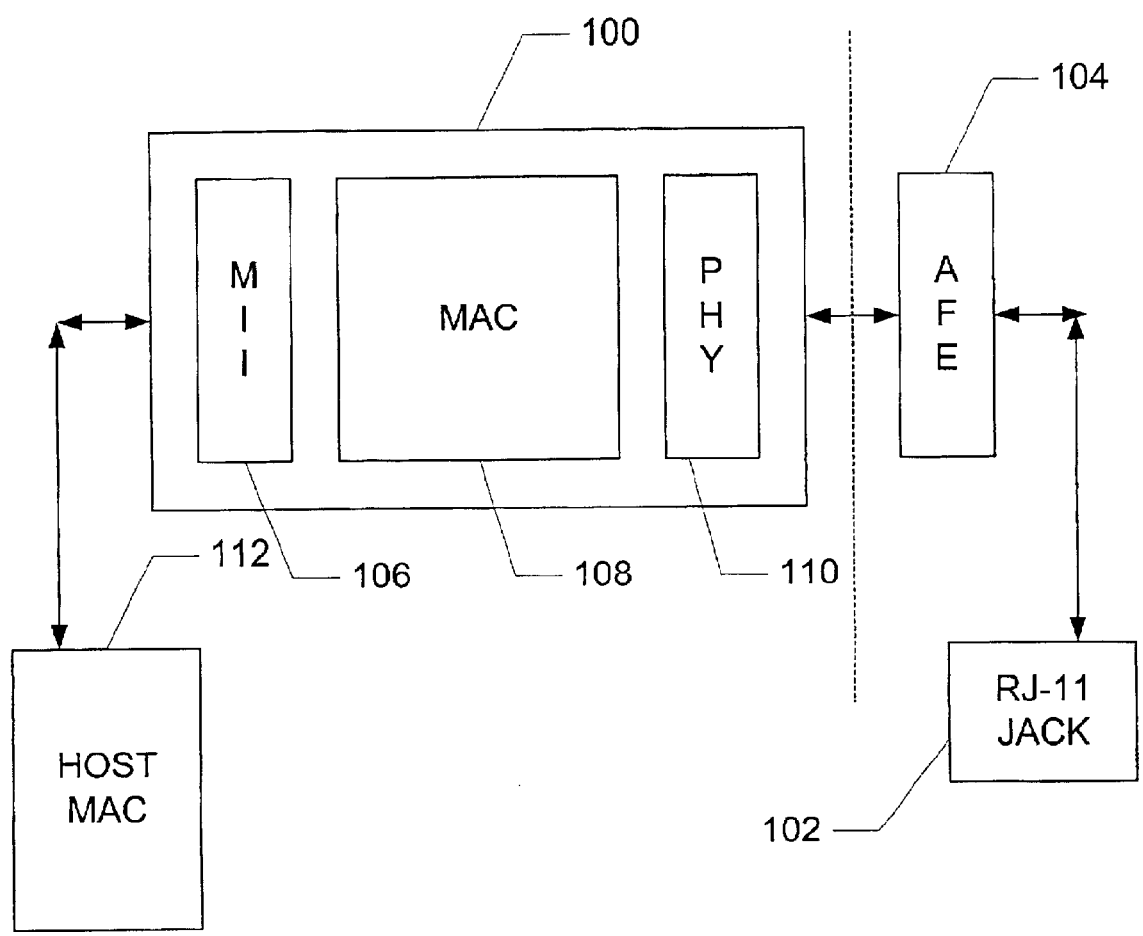
FIG. 1 illustrates a home phone line network. The Home Phone Line Networking Alliance (HPNA) has published a specification to standardize the behavior of home phone line networks.
Figure 2:
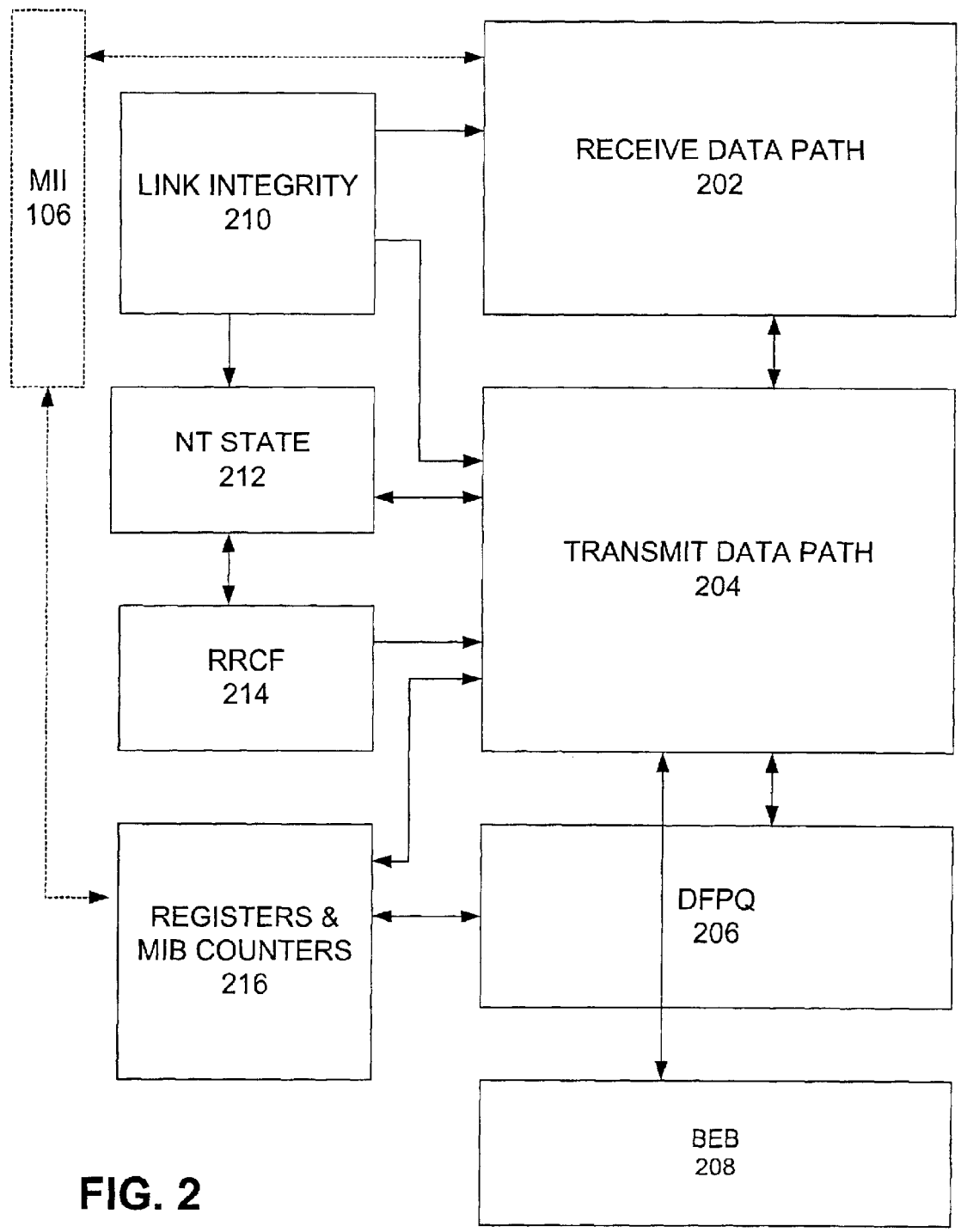
FIG. 2 illustrates a preferred embodiment of the MAC 108 in accordance with the present invention.

FIG. 2 illustrates a preferred embodiment of the MAC 108 in accordance with the present invention. The MAC 108 comprises a Receive Data Path 202, a Transmit Data Path 204, a Distributed Fair Priority Queuing (DFPQ) 206, a Binary Exponential Backoff (BEB) 208, a Link Integrity 210, a Network State 212, a Rate Request Control Frame (RRCF) 214, a plurality of registers and Management Information Base (MIB) counters 216.

The Receive Data Path 202 receives data packets from the PHY 110 and sends data packets to the MII 106. In the preferred embodiment, after each data packet sent by the Receive Data Path 202, another packet, referred to herein as a "frame status frame", is sent immediately following. The frame status frame contains certain status information required by subsequent processes.

The Transmit Data Path 204, which receives data packets from the MII 106 and transmits them to the PHY 110.

The DFPQ 206 and the BEB 208 provide collision resolution. The DFPQ 206 provides collision resolution for the 10 mpbs data rate, while the BEB 208 provides collision resolution for the 1 mpbs data rate. In the preferred embodiment, the PHY 110 will provide a collision detect signal. Either the DFPQ 206 or the BEB 208 will then attempt to resolve the collision. Link Integrity 210 monitors the physical network conditions. In the preferred embodiment, the Link Integrity 210 updates a link status bit in a link register. The Link Integrity 210 also sends link packets in accordance with HPNA 2.0.

The RRCF 214 sends a RRCF whenever the MAC 108 transitions between data rates. The RRCF is used to perform the rate negotiation function, i.e., to determine what is the data rate to communicate between different stations in a home phone line network.

The registers and MIB counters 216 provides programmability to the MAC 108 and handles error event counting.

The Network State 212 in accordance with the present invention monitors the current mode of the MAC 108, i.e., whether the MAC 108 is operating in the 1M8 mode, the V1M2 mode, or the 10M8 mode.

To support the three network states under HPNA 2.0 using two network states, the three network state equations for V1M2_MODE, 1M8_MODE, and 10M8_MODE, set forth in the Background are collapsed into two equations. To accomplished this, when a 10M8 station is in the V1M2 mode, instead of transmitting this frame in the 10M8 compatible format, the frame is transmitted in the 1M8 format frame without any gaps in the frame. Thus, the following equations apply:

V1M2_MODE=1M8_MODE

ConfigV1M2=ConfigV1

Using the above equations, the three network state equations set forth in HPNA 2.0 becomes the following:

1M8_MODE:=(ConfigV1 or ConfigV1 M2) or (not ConfigV2 and (V1_SIGNALED or V1_DETECTED)

10M8_MODE:=not 1M8_MODE

The definitions for ConfigV1, ConfigV1M2, ConfigV2, V1_SIGNALED, and V1_DETECTED remain unchanged.

In this manner, the three network states of HPNA 2.0 is supported using two network states. With only two network states, the complexity of the Network State 212 is reduced. Also, the PHY 110 which supports only the 1M8 and 10M8 native format frame may be used.

A network state machine which supports the three network states of the Home Phone Line Networking Alliance (HPNA) specification version 2.0 using two network states has been disclosed. When a station is in the V1M2 mode, instead of transmitting this frame in the 10M8 format frame with the gap frame, the frame is transmitted in the 1M8 format frame without any gaps in the frame. With this, the three network state equations of HPNA 2.0 collapses into two equations. With only two network states, the complexity of the network state machine is reduced, and a Physical Layer (PHY) which supports only the two network states may be used.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A network state machine for a home phone line network, comprising:

a first signal, wherein asserting the first signal programs the network state machine for a first mode;

a second signal, wherein asserting the second signal programs the network state machine for a second mode; and a third signal, wherein asserting the third signal programs the network state machine for a third mode, wherein an asserted second signal is substituted for an asserted first signal, wherein a network state is the second mode if the asserted second signal is substituted for the asserted first signal, wherein the network state is the second mode if the second signal is asserted, wherein the network state is the third mode if the network state is not the second mode.

2. The network state machine of claim 1, further comprising:

a fourth signal, wherein asserting the fourth signal indicates a detection of a frame in a second mode format with a private communication field (PCOM) set to "1" while a station is in the third mode and a Link Integrity Status is set to "DOWN", or a detection of a frame in the second mode format with a PCOM set to "0"; and a fifth signal, wherein asserting the fifth signal indicates a detection or transmission of a frame in the second mode format with a PCOM set to "2", wherein the network state is the second mode if the first signal or the second signal is asserted, or if the fourth signal or the fifth signal is asserted and the third signal is not asserted, wherein the network state is the third mode if the network state is not the second mode.

3. The network state machine of claim 1, wherein the first signal is a ConfigV1M2 signal under a Home Phone Line Networking Alliance specification version 2.0 ("HPNA 2.0").

4. The network state machine of claim 1, wherein the second signal is a ConfigV1 signal under HPNA 2.0.

5. The network state machine of claim 1, wherein the third signal is a ConfigV2 signal under HPNA 2.0.

6. The network state machine of claim 2, wherein the fourth signal is a V1_DETECTED signal under HPNA 2.0.

7. The network state machine of claim 2, wherein the fifth signal is a V1_SIGNALED signal under HPNA 2.0.

8. The network state machine of claim 2, wherein the PCOM field set to "1" refers to a station in the first mode or a station in the second mode if the fourth signal is not asserted.

9. The network state machine of claim 2, wherein the PCOM field set to "0" refers to a station which supports a 1 megabit-per-second (mpbs) data rate but not a 10 mpbs data rate.

10. The network state machine of claim 2, wherein the PCOM field set to "2" refers to a station in the first mode or a station in the second mode if the fifth signal is asserted.

11. A network state machine for a home phone line network, comprising:
- a first signal, wherein asserting the first signal programs the network state machine for a first mode;
- a second signal, wherein asserting the second signal programs the network state machine for a second mode;
- a third signal, wherein asserting the third signal programs the network state machine for a third mode;
- a fourth signal, wherein asserting the fourth signal indicates a detection of a frame in a second mode format with a PCOM set to "1" while a station is in the third mode and a Link Integrity Status is set to "DOWN", or a detection of a frame in the second mode format with a PCOM set to "0"; and
- a fifth signal, wherein asserting the fifth signal indicates a detection or transmission of a frame in the second mode format with a PCOM set to "2",
- wherein a network state is the second mode if the first signal or the second signal is asserted, or if the fourth signal or the fifth signal is asserted and the third signal is not asserted,
- wherein the network state is the third mode if the network state is not the second mode.

12. The network state machine of claim 11, wherein the first signal is a ConfigV1M2 signal under HPNA 2.0.

13. The network state machine of claim 11, wherein the second signal is a ConfigV1 signal under HPNA 2.0.

14. The network state machine of claim 11, wherein the third signal is a ConfigV2 signal under HPNA 2.0.

15. The network state machine of claim 11, wherein the fourth signal is a V1_DETECTED signal under HPNA 2.0.

16. The network state machine of claim 11, wherein the fifth signal is a V1_SIGNALED signal under HPNA 2.0.

17. The network state machine of claim 11, wherein the PCOM field set to "1" refers to a station in the first mode or a station in the second mode if the fourth signal is not asserted.

18. The network state machine of claim 11, wherein the PCOM field set to "0" refers to a station which supports a 1 megabit-per-second (mpbs) data rate but not a 10 mpbs data rate.

19. The network state machine of claim 11, wherein the PCOM field set to "2" refers to a station in the first mode or a station in the second mode if the fifth signal is asserted.

20. A network state machine for a home phone line network, comprising:
- a ConfigV1M2 signal, wherein asserting the ConfigV1M2 signal programs the network state machine for a V1M2 mode;
- a ConfigV1 signal, wherein asserting the ConfigV1 signal programs the network state machine for a 1M8 mode;
- a ConfigV2 signal, wherein asserting the ConfigV2 signal programs the network state machine for a 10M8 mode;
- a V1_DETECTED signal, wherein asserting the V1_DETECTED signal indicates a detection of a 1M8 format frame with a PCOM set to "1" while a station is in the 10M8 mode and a Link Integrity Status is set to "DOWN", or a detection of a 1M8 format fame with a PCOM set to "0"; and
- a V1_SIGNALED signal, wherein asserting the V1_SIGNALED signal indicates a detection or transmission of a 1M8 format frame and with a PCOM set to "2",
- wherein a network state is the 1M8 mode if the ConfigV1M2 signal or the ConfigV1 signal is asserted, or if the V1_DETECTED signal or the V1_SIGNALED signal is asserted and the ConfigV2 signal is not asserted,
- wherein the network state is the 10M8 mode if the network state is not the 1M8 mode.

21. A method for supporting three network states under HPNA 2.0 using two network states, comprising the steps of:
- (a) determining if a first signal, a second signal, or a third signal is asserted, wherein an asserted first signal programs a network state machine for a first mode, wherein an asserted second signal programs the network state machine for a second mode, and wherein an asserted third signal programs the network state machine for a third mode;
- (b) substituting an asserted second signal for an asserted first signal;
- (c) setting a network state to the second mode if the second signal is asserted;
- (d) setting the network state to the third mode if the network state is not the second mode; and
- (e) setting the network state to the second mode if the asserted second signal is substituted for the asserted first signal.

22. The method of claim 21, wherein the determining step (a) further comprises:
- (a1) determining if a fourth signal or a fifth signal is asserted, wherein an asserted fourth signal indicates a detection of a frame in a second mode format with a PCOM set to "1" while a station is in the third mode and a Link Integrity Status is set to "DOWN", or a detection of a frame in the second mode with a PCOM set to "0", wherein an asserted fifth signal indicates a detection or transmission of a frame in the second mode format with a PCOM set to "2".

23. The method of claim 21, wherein the setting step (c) comprises:
- (c1) setting a network state to the second mode if the first signal or the second signal is asserted, or if the fourth signal or the fifth signal is asserted and the third signal is not asserted.

24. The method of claim 21, wherein the first signal is a ConfigV1M2 signal under HPNA 2.0.

25. The method of claim 21, wherein the second signal is a ConfigV1 signal under HPNA 2.0.

26. The method of claim 21, wherein the third signal is a ConfigV2 signal under HPNA 2.0.

27. The method of claim 22, wherein the fourth signal is a V1_DETECTED signal under HPNA 2.0.

28. The method of claim 22, wherein the fifth signal is a V1_SIGNALED signal under HPNA 2.0.

29. The method of claim 22, wherein the PCOM field set to "1" refers to a station in the first mode or a station in the second mode if the fourth signal is not asserted.

30. The method of claim 22, wherein the PCOM field set to "0" refers to a station which supports a 1 mpbs data rate but not a 10 mpbs data rate.

31. The method of claim 22, wherein the PCOM field set to "2" refers to a station in the first mode or a station in the second mode if the fifth signal is asserted.

32. A method for supporting three network states under HPNA 2.0 using two network states, comprising the steps of:
 (a) determining if a first signal, a second signal, or a third signal is asserted, wherein an asserted first signal programs a network state machine for a first mode, wherein an asserted second signal programs the network state machine for a second mode, and wherein an asserted third signal programs the network state machine for a third mode;
 (b) determining if a fourth signal or a fifth signal is asserted, wherein an asserted fourth signal indicates a detection of a frame in a second mode format with a PCOM set to "1" while a station is in the third mode and a Link Integrity Status is set to "DOWN", or a detection of a frame in the second mode with a PCOM set to "0", wherein an asserted fifth signal indicates a detection or transmission of a frame in the second mode format with a PCOM set to "2";
 (c) setting a network state to the second mode if the first signal or the second signal is asserted, or if the fourth signal or the fifth signal is asserted and the third signal is not asserted; and
 (d) setting the network state to the third mode if the network state is not the second mode.

33. The method of claim 32, wherein the first signal is a ConfigV1M2 signal under HPNA 2.0.

34. The method of claim 32, wherein the second signal is a ConfigV1 signal under HPNA 2.0.

35. The method of claim 32, wherein the third signal is a ConfigV2 signal under HPNA 2.0.

36. The method of claim 32, wherein the fourth signal is a V1_DETECTED signal under HPNA 2.0.

37. The method of claim 32, wherein the fifth signal is a V1_SIGNALED signal under HPNA 2.0.

38. The method of claim 32, wherein the PCOM field set to "1" refers to a station in the first mode or a station in the second mode if the fourth signal is not asserted.

39. The method of claim 32, wherein the PCOM field set to "0" refers to a station which supports a 1 mpbs data rate but not a 10 mpbs data rate.

40. The method of claim 32, wherein the PCOM field set to "2" refers to a station in the first mode or a station in the second mode if the fifth signal is asserted.

41. A method for supporting three network states under HPNA 2.0 using two network states, comprising the steps of:
 (a) determining if a ConfigV1M2 signal, a ConfigV1 signal, or a ConfigV2 signal is asserted, wherein an asserted ConfigV1M2 signal programs a network state machine for a V1M2 mode, wherein an asserted ConfigV1 signal programs the network state machine for a 1M8 mode, and wherein an asserted ConfigV2 signal programs the network state machine for a 10M8 mode;
 (b) determining if a V1_DETECTED signal or a V1_SIGNALED signal is asserted, wherein an asserted V1_DETECTED signal indicates a detection of a frame in a 1M8 frame format with a PCOM set to "1" while a station is in the 10M8 mode and a Link Integrity Status is set to "DOWN", or a detection of a 1M8 frame with a PCOM set to "0", wherein an asserted V1_SIGNALED indicates a detection or transmission of a 1M8 format frame with a PCOM set to "2";
 (c) setting a network state to the 1M8 mode if the ConfigV1M2 signal or the ConfigV1 signal is asserted, or if the V1_DETECTED signal or the V1_SIGNALED signal is asserted and the ConfigV2 signal is not asserted; and
 (d) setting the network state to the 10M8 mode if the network state is not the 1M8 mode.

* * * * *

UNITED STATES PATENT AND TRADEMARK OFFICE
CERTIFICATE OF CORRECTION

PATENT NO. : 6,925,089 B2 Page 1 of 1
DATED : August 2, 2005
INVENTOR(S) : Peter Ka-Fai Chow and William Young It is certified that error appears in the above-identified patent and that said Letters Patent is hereby corrected as shown below:

<u>Column 3,</u>
Line 24, create a new paragraph after "." and before "link".

Signed and Sealed this

Twenty-third Day of May, 2006

JON W. DUDAS
*Director of the United States Patent and Trademark Office*